United States Patent [19]

Tashiro et al.

[11] 4,227,226
[45] Oct. 7, 1980

[54] CASSETTE TAPE PLAYER

[75] Inventors: Takashi Tashiro, Kawasaki; Manabu Sugai; Akira Matsumoto, both of Yokohama, all of Japan

[73] Assignee: Matsushita Electric Industrial Co., Inc., Osaka, Japan

[21] Appl. No.: 963,045

[22] Filed: Nov. 22, 1978

[30] Foreign Application Priority Data

| Nov. 28, 1977 | [JP] | Japan | 52-143197 |
| Nov. 28, 1977 | [JP] | Japan | 52-143198 |
| Nov. 28, 1977 | [JP] | Japan | 52-143199 |
| Apr. 26, 1978 | [JP] | Japan | 53-50552 |

[51] Int. Cl.² .................. G11B 15/24; G11B 21/22
[52] U.S. Cl. ........................ 360/137; 360/71; 360/96.5; 360/105
[58] Field of Search .............. 360/137, 96.5, 96.6, 360/105, 71

[56] References Cited

U.S. PATENT DOCUMENTS

| 3,758,119 | 9/1973 | Harlan | 360/96.5 |
| 3,987,486 | 10/1976 | Ito et al. | 360/105 |
| 4,033,491 | 7/1977 | Aldenhoven | 360/137 |
| 4,101,949 | 7/1978 | Cicatelli | 360/137 |

Primary Examiner—Robert S. Tupper
Attorney, Agent, or Firm—Stevens, Davis, Miller & Mosher

[57] ABSTRACT

A cassette tape player of a type wherein a cassette which has been inserted horizontally into the player, is moved vertically so as to be set in the playing position. The player has means for slightly moving back the cassette horizontally before it is moved vertically subsequently to the horizontal insertion, and means for managing the ejecting, forwarding, and rewinding operations, as well as release from the forwarding or rewinding operation to the normal playing condition, by making use of an axial movement and a rotation of a single shaft.

7 Claims, 31 Drawing Figures

CASSETTE TAPE PLAYER

BACKGROUND OF THE INVENTION

The present invention relates to a cassette tape player of a type in which a cassette inserted horizontally into the player is automatically moved vertically so as to be set in the playing condition.

This type of cassette tape player has been disclosed in the specification of U.S. Pat. No. 3,395,871 (corres. German Pat. No. 1,207,693) and in Japanese Patent Publication No. 31449/1972. In this type of player, the cassette is automatically moved vertically, when inserted into the player to a predetermined depth in the horizontal direction. It is therefore likely to occur that the user's finger is accidentally caught between the cassette and the player when it is used to push the cassette deep into the player. In addition, a considerably large force is required for moving the cassette vertically, because such a vertical movement is made while the cassette is being depressed in the horizontal direction by fingers.

Further, it is desirable to arrange such that the head, pinch roller and other associated parts are automatically moved toward the cassette, when the latter is set in the playing condition so as to put the player into the playing state. When such an arrangement is adopted, careful consideration should be taken so as to prevent the head and the pinch roller from being moved to the playing position before the setting of the cassette to the playing position, for otherwise the automatical setting of the cassette in the playing position may be hindered by the head and the pinch roller.

Meanwhile, Japanese Patent Publication No. 40523/1975 discloses a cassette tape player in which ejecting, forwarding and rewinding operations can be managed by a single lever so as to facilitate and simplify these operations. More specifically, this lever is moved horizontally to the left and right for initiating the forwarding and rewinding operations. Thus, in this cassette tape player, it is necessary to preserve a space for accommodating the left and rightward swing of the lever. This means that it is impossible to locate the other parts close to the lever.

SUMMARY OF THE INVENTION

It is a major object of the invention to overcome these problems of the prior art.

Namely, it is an object of the invention to provide a cassette tape player in which the insertion of the cassette can be made without the fear of catching a finger between the cassette and the player, and in which the ejecting, forwarding and rewinding operations can be made easily.

It is another object to provide a cassette tape player in which the ejecting, forwarding and rewinding operations can be managed simply by a depression and rotation of a single shaft.

It is still another object of the invention to provide a cassette tape player in which the head and the pinch roller are usually locked and are unlocked to move the playing positions only after the cassette has been set in the playing position.

It is a further object of the invention to provide a cassette tape player in which the ejecting operation is initiated by a turning off of the power source switch, even during the playing.

To this end, according to the invention, there is provided a cassette tape player comprising: means for setting a cassette which has been inserted into the player horizontally, in the playing position by moving the cassette vertically after moving the same horizontally by a small distance in the reverse direction to the direction of the horizontal insertion; an ejecting shaft which is movable in one direction and also rotatable, said ejecting shaft being adapted to manage the forwarding and the rewinding operations in addition to the ejecting operation; first means adapted to trigger the ejecting operation when the ejecting shaft is depressed, and the forwarding and rewinding operations when rotated in respective directions, the ejecting shaft being further adapted to trigger the resetting of the player to the playing condition when depressed while the tape is forwarded or rewound; and instructing means adapted to detect the running state of the tape and to instruct, when the tape is being forwarded or rewound, the first means to reset the player to the playing condition, by the force produced when the running tape is stopped.

These and other objects, as well as advantageous features of the invention will become more clear from the following description of the preferred embodiment taken in conjunction with the accompanying drawings.

DESCRIPTION OF THE PREFERRED EMBODIMENT

Figure 1:
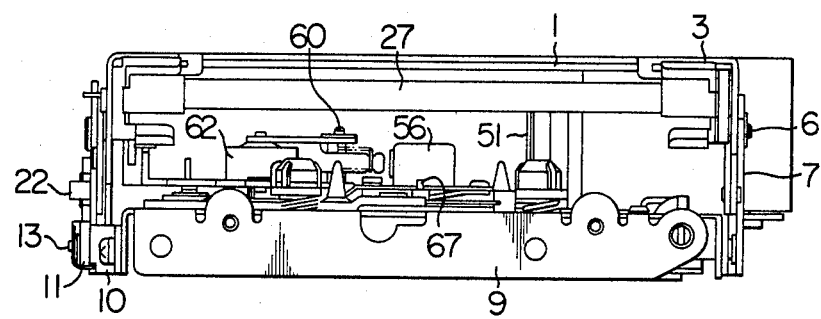
FIG. 1 is a front elevational view of a cassette tape player embodying the present invention.

Referring first to FIGS. 1 to 6, a cassette tape player embodying the present invention has a guide holder 1 provided at its each side with a tape guide 3 for guiding a cassette 2. Each tape guide 3 has a protrusion or a boss 5 which is rotatably held by a cassette holder (4) which in turn is provided with a protrusion or a boss 6. A holding plate 7 rotatably holds the cassette holder 4 at one side of the latter, and extends at a right angle to the horizontal surface of the main chassis 9. An auxiliary plate 8 is rotatably held at its both ends by the holding plate 7 and the guide holder 1, respectively.

A side plate 10 is attached to one side of the main chassis 9 and is provided at its outer side with projections 13, 14 for rotatably carrying a timing stopper 11 and a slide stopper 12, as well as elongated bores 15 to 18.

A first slide plate 19 is movable in the horizontal direction, i.e. in the direction of insertion and withdrawal of the cassette, relatively to the main chassis 9, and is pulled toward the front side by a slide spring 23. The first slide plate 19 has an elongated bore 20 which associates with a projection 21 provided on a charge plate 27, and a projection 22 which is adapted to project through the elongated bore 16.

A second slide plate 24 is disposed below the first slide plate 19 and is also pulled toward the front side by a hop-up spring 25. This second plate is held, as is the case of the first slide plate 19, slidably in the horizontal direction relatively to the chassis 9, by means of a guide shaft 41 which associates with the elongated bore 17.

The charge plate 27 is held at its one end rotatably relatively to the holding plate 7 and the main chassis 9, at the inside of the guide holder 1 and the holding plate 7, and is supported rotatably at its other end on the inside of the side plate 10.

An eject plate 28 is supported rotatably in its base portion on the main chassis 9. An eject spring 29 is disposed to act between the eject plate 28 and the slide plate 19. The eject plate 28 has an engaging portion 32 adapted for engagement with a stopper piece 31 of a stopper 30, and an unlocking piece 33.

A slide stopper spring 34 is adapted to bias the slider stopper 12 in the clockwise direction. A hook plate 35 is rotatably held by the slide plate 19, and is biased in the clockwise direction by a hook spring 36 which is retained by the slide plate 19. The hook plate 35 has an engaging portion 38 for engagement with a projection 37 formed on the second slide plate 24, and a projection 39 cooperating with the unlocking piece 33 of the eject plate 28.

A cassette holder spring 40 is retained at its one end by the second slide plate 24 at its other end by the cassette holder 4.

Figure 3:
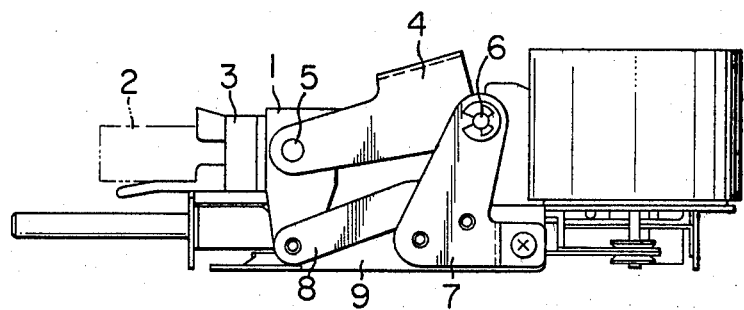
FIG. 3 is a right-hand side elevational view of the cassette player as shown in FIG. 1.
Figure 4:
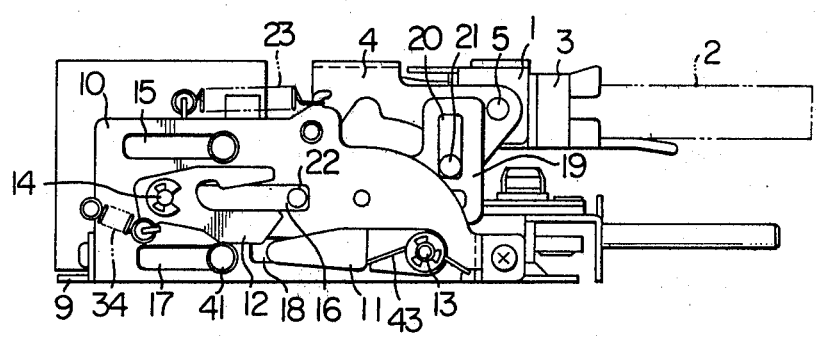
FIG. 4 is a left-hand side elevational view of the cassette tape player as shown in FIG. 1.
Figure 5:
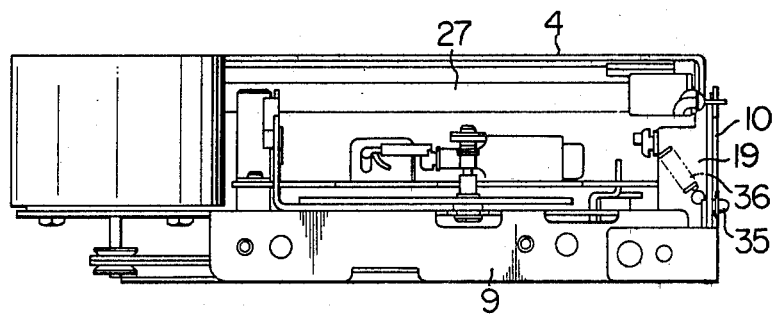
FIG. 5 is a rear elevational view of the cassette tape player as shown in FIG. 1.
Figure 6:
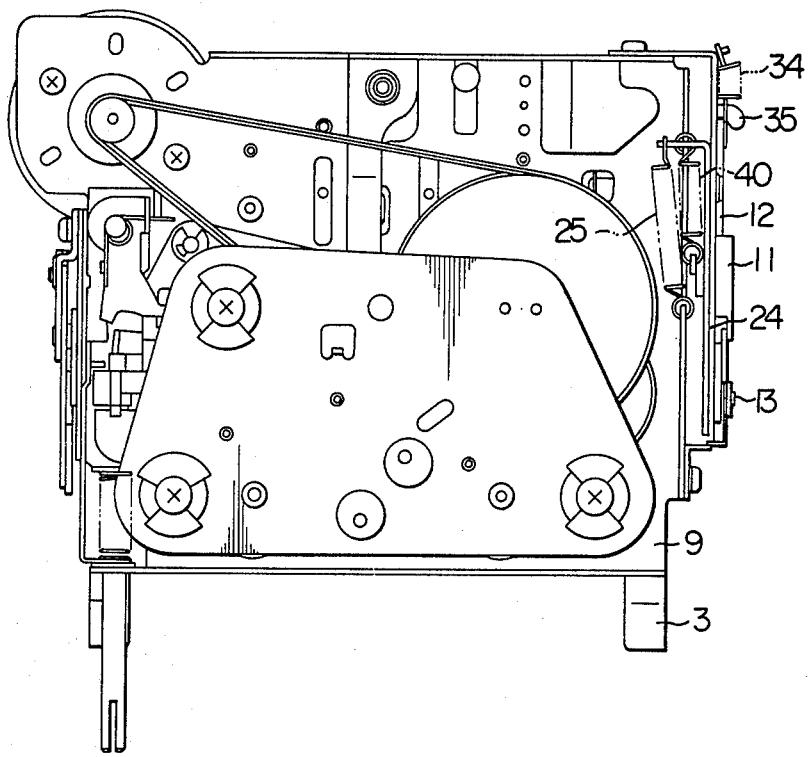
FIG. 6 is a bottom plan view of the cassette tape player as shown in FIG. 1.
Figure 7:
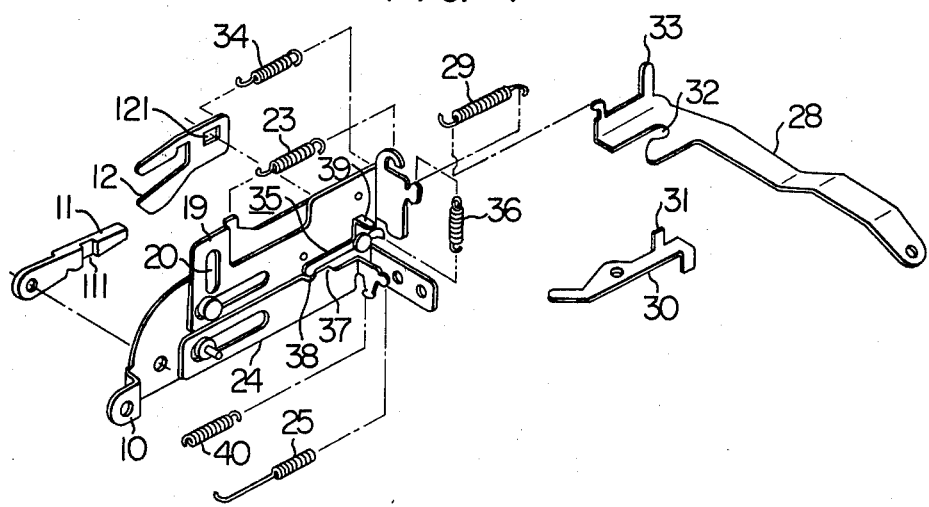
FIG. 7 shows a part of the cassette tape player as shown in FIG. 1, FIGS. 8 to 10 show the operation of a part of the cassette tape player as shown in FIG. 1, FIGS. 11 to 25 are detailed illustrations of the part of the cassette tape player as shown in FIG. 1, and FIGS. 26 to 28 show the electric circuits as incorporated in the cassette tape player as shown in FIG. 1.
Figure 8:
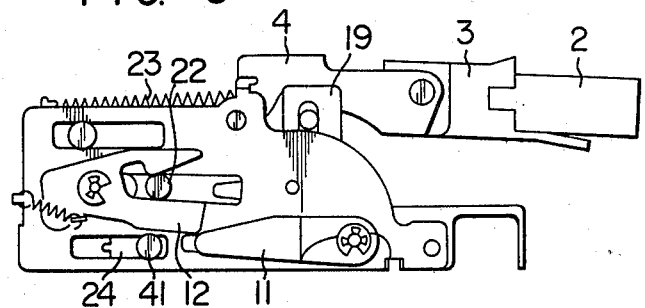
Figure 9:
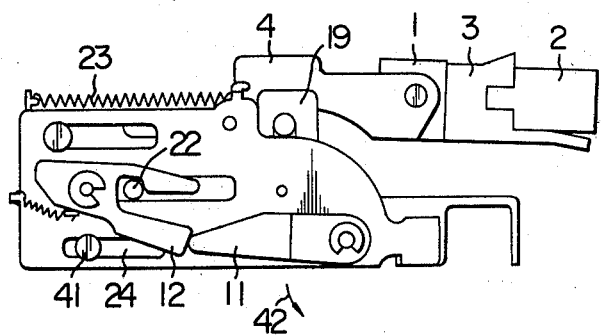
Figure 10:
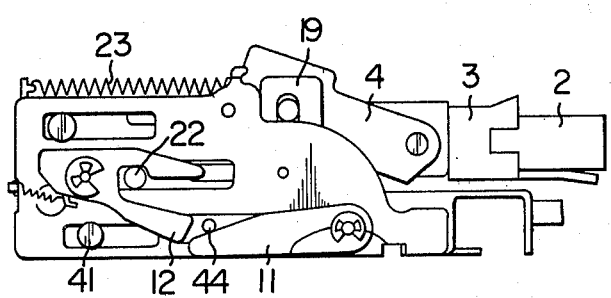

FIG. 7 shows in more detail the side plate 10 and associated members, while FIGS. 8 to 10 shows the steps of setting of the cassette 2 in the playing position, from the first step of cassette insertion as shown in FIG. 4 to the final step of setting as shown in FIG. 3.

Hereinafter, the operation of the cassette tape player of the invention, having the described construction, will be described.

At first, the cassette 2 is placed as shown FIG. 4 to the player, and is inserted into the latter along the tape guides 3. As a result, the slide plate 19 is moved progressively as shown in FIGS. 8 and 9 through the action of the charge plate 27. In the course of movement of the slide plate 19, the projection 22 formed on the slide plate 19 comes to engage the stopper 12 as shown in FIG. 8. As the slide plate 19 is further moved, the projection 22 is caught by the stopper 12, as shown in FIG. 9. A guide shaft 41 provided on the second slide plate 24 is adapted to limit the movement of the stopper 12. At the same time, the hook plate 35 mounted on the slide plate 19 is biased so as to be engaged by the second slide plate 24. When the slide plate 19 has been moved to a certain position from the position as shown in FIG. 4, the engaging portion 38 comes to engage the projection 37 so that the further movement of the slide plate 19 is accompanied by the movement of the second slide plate 24.

In the course of the movement of the second slide plate 24, the guide shaft 41 is moved along the elongated bore 17, as shown in FIGS. 8 and 9. During this movement, the stopper 12 is allowed to rotate as shown in FIG. 9 so as to catch the projection 22. Since the projection 22 is caught by the stopper 12, the cassette 2 is locked in the state as shown in FIG. 9.

Since the aperture 121 by which the stopper 12 is held on the side plate 10 has an elongated form as shown in FIG. 7, the slide plate 19 and the projection 22 are moved slightly back in the direction opposite to the direction of insertion of the cassette, by the action of the slide spring 23, when the cassette is released from the inserting depression force. This slight backward movement of the slide plate 19 causes a movement of the stopper 12. As a result, the timing stopper 11 is hit by one end of the stopper 12 and rotated in the direction of the arrow 42. The stopper 11 is biased in the clockwise direction, i.e. in the direction opposite to the direction of the arrow 42, by means of the spring 43. As the timing stopper 11 is rotated in the direction of the arrow 42, the projection 44 provided at one end of the cassette holder 4 is disengaged from a recess 111 of the timing stopper 11 so that the cassette holder 4 is rotated as shown in FIG. 10, thereby to move the cassette 2 vertically to a position where it opposes to the driving system including the capstan reel shaft and so forth on the main chassis.

Thus, according to the described construction, the cassette which has been inserted into the player to a predetermined depth is moved aback slightly, when released from the inserting depression force. Then, a part of the force for moving the cassette aback causes locking means including the stopper 12 to hit the timing stopper 11. The timing stopper initiates the operation of means for moving the cassette vertically, the stopper 12, thereby the cassette holder 4 is unlocked and turned to set the cassette in the playing position.

Consequently, a finger can never be caught between the cassette and the player when it pushes the cassette into the player. Further, since the vertical movement of the cassette is triggered only after the cassette is released from the manual inserting force, the force required for vertically moving the cassette need not be so large as to overcome the resistance caused by the finger, because there is no manual force exerted on the cassette when the latter is moved vertically.

For ejecting the cassette, the stopper 30 is swung and disengaged from the eject plate 28 so that the eject plate 28 is rotated clockwise, i.e. toward the back side of the player by the force of the eject spring 29.

Consequently, the unlocking piece 33 of the plate 28 swingingly drives the hook plate 35, so as to unlock the second slide plate 24, thereby to allow the latter to be reset. As the second slide plate 24 is reset, the guide shaft 41 turns the stopper 12 such that the projection 22 is disengaged, so that the player is reset from the state as shown in FIG. 10 to the starting condition as shown in FIG. 4. Simultaneously, since the charge plate 27 is also reset to the starting position, the cassette 2 is ejected out of the player along the tape guides 3.

The operation of the player for setting the cassette in the playing position and the ejecting operation have been described. Hereinafter, a description will be made as to how the movement of the head and the pinch roller is related to the setting of the cassette to the playing position, with reference to FIGS. 11 and 12, as well as to the preceding figures. It is to be noted here that a cassette tape player according to the present invention is in the type wherein when a cassette is set in the playing position of the cassette tape player, a motor is energized to rotate through a belt a flywheel which in turn rotates one of cassette reel shafts through a idler wheel.

However, such an arrangement is well-known so that the explanation thereof is omitted.

A cassette detecting piece 51 is supported movably relatively to the main chassis 9, and is biased forwardly by means of a spring. The cassette detecting piece 51 has a surface 52 for abutting the charge plate 27, and a stopper portion 53. A head mounting plate 54 is carried so as to move relative to the main chassis 9, as is the case of the cassette detecting piece 51, in the same direction of movement of the cassette detecting piece 51. This head mounting plate 54 carries a head 55 through an angle adjusting plate 56, and has a groove 58 adapted to be engaged by a forward/rewind lever 57 as well as a groove 59 for relieving the pinch roller mounting shaft 60 provided on the main chassis 9.

A shaft 61 which is provided on the head mounting plate 54 and is adapted to press the pinch roller 62. The shaft 61 holds a spring 63 which acts also to bias the head mounting plate 54 forwardly.

A stopper 64 for the head mounting plate 54 is attached to the back side of the main chassis 9, together with a lock spring 65. This stopper 64 has a cassette movement detecting piece 67 provided with an engaging portion 66 for engagement with the stopper portion 53 of the cassette detecting piece 51. The stopper 64 further has a stopper piece 68 which projects through the bore 69 of the main chassis 9 into engagement with a bore (not shown) formed in the head mounting plate 54. A reference numeral 70 denotes a bore through which the cassette movement detecting piece 67 of the head mounting plate stopper 64 is projected upwardly.

Figure 2:
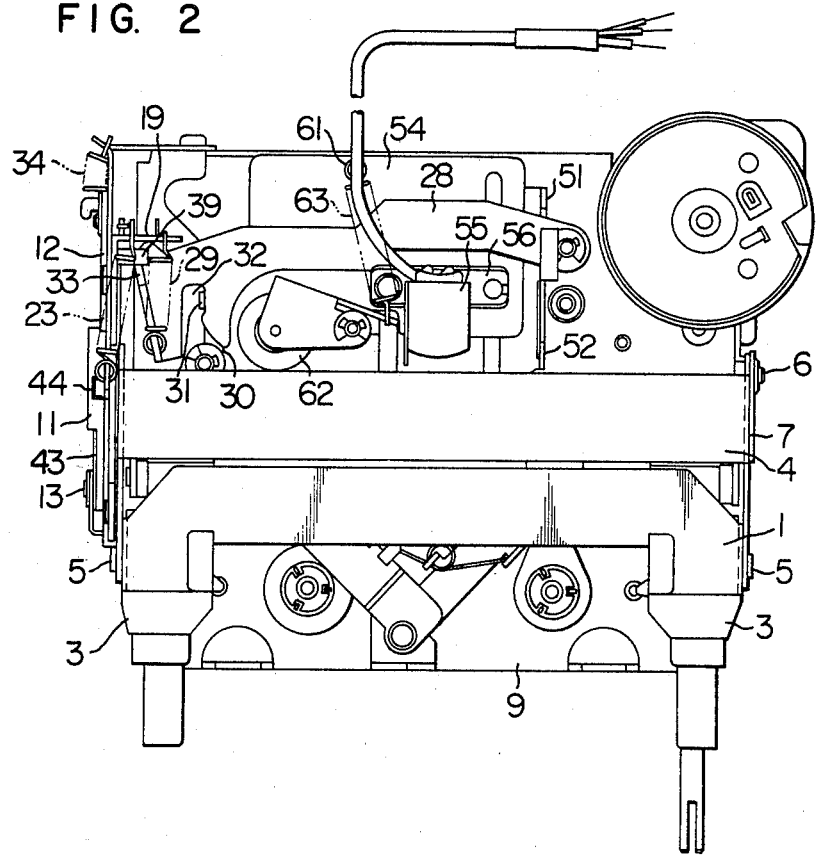
FIG. 2 is a top plan view of the cassette tape player as shown in FIG. 1.

According to this construction, when the cassette takes the position as shown in FIG. 2, i.e. when the cassette 2 is out of the position for the playing as shown in FIG. 10, the head mounting plate stopper 64 is biased by the lock leaf spring 65 so as to project the cassette movement detecting piece 67 and the stopper piece 68 above the main chassis 9. Consequently, the engaging portion 66 is held as shown in FIG. 11 in engagement with the cassette detecting piece 51 which is pulled forwardly by the spring, so that the cassette detecting piece 67 is prevented from moving downwardly on the chassis 9.

In this state, the stopper piece 68 of the head mounting plate stopper 64 is made into engagement with a bore (not shown) formed in the head mounting plate 54, so that the head mounting plate is also prevented from moving forwardly.

Figure 11:
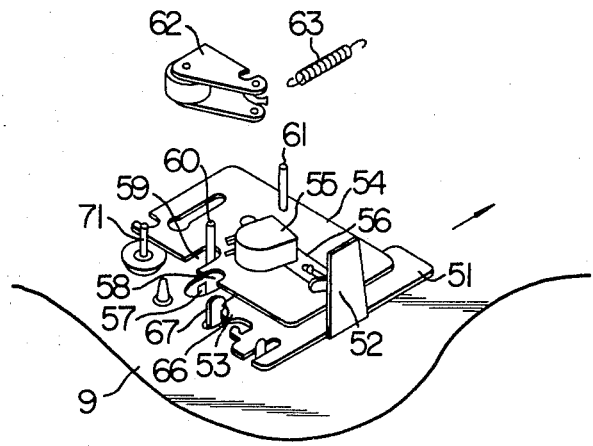
Figure 12:
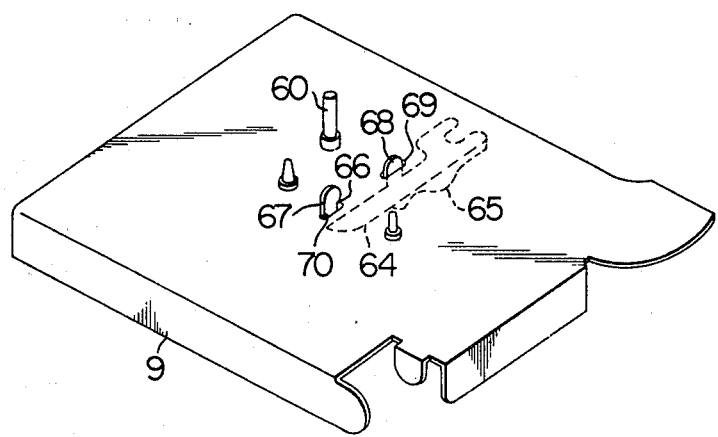

Then, as the cassette 2 is inserted deeper into the player, the charge plate 27 is moved to displace the cassette detecting piece 51 in the direction of the arrow in FIG. 11. Consequently, the engaging portion 66 is disengaged from the stopper portion 53.

As the cassette 2 is inserted to the position as shown in FIG. 9 and then moved to the position as shown in FIG. 10 in the manner stated before, the cassette 2 presses the cassette movement detecting piece 67, which has been unlocked already, toward the main chassis 9. As a result, the stopper piece 68 is retracted into the main chassis 9 so as to unlock the head mounting plate 54. The head mounting plate 54 is therefore moved toward the cassette 2, i.e. into the playing position. During this movement, the spring 63 acts to exert the force by which the head mounting plate 54 is moved to the playing position. After the head mounting plate 54 has been moved to the playing position, the same spring 63 functions to press the pinch roller 62 against the capstan 17.

Then, as the head mounting plate 54 in this playing state is pressed in the direction of the arrow, i.e. rearwardly, by means of the lever 57, the pinch roller 62 is released from the pressing force and moved away from the capstan 71, so that the player is switched for the forwarding or rewinding.

On the other hand, when the ejecting operation is triggered in the playing condition, the eject plate 28 is moved and comes into contact with the supporting shaft 61, so as to forcibly reset the head mounting plate 54. As a result, the cassette 2 is allowed to move from the position as shown in FIG. 10 to the position as shown in FIG. 9. Further, as a result of the eject of the cassette 2 to the position as shown in FIG. 4, the cassette detecting piece 51 is reset also so that the head mounting plate 54 is locked by means of the head mounting plate stopper 64.

As has been described, the primary unlocking, i.e. the release of the head mounting plate 54 from the stopper 64, is effected by the insertion of the cassette, and then the movement of the head mounting plate 54 is effected as the cassette 2 is set in the playing position. Consequently, the movement of the head 55 and the pinch roller 62 can be made in the correct timed relationship to the movement of the cassette, and the erroneous movement of the head 55 and the pinch roller 62 in other timing than mentioned above can fairly be avoided.

Figure 13:
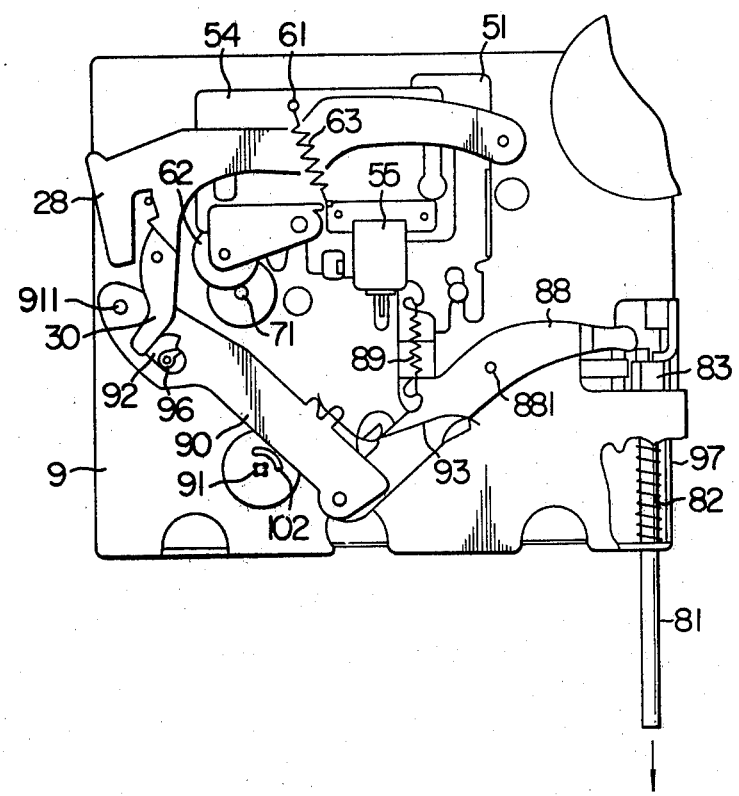
Figure 14:
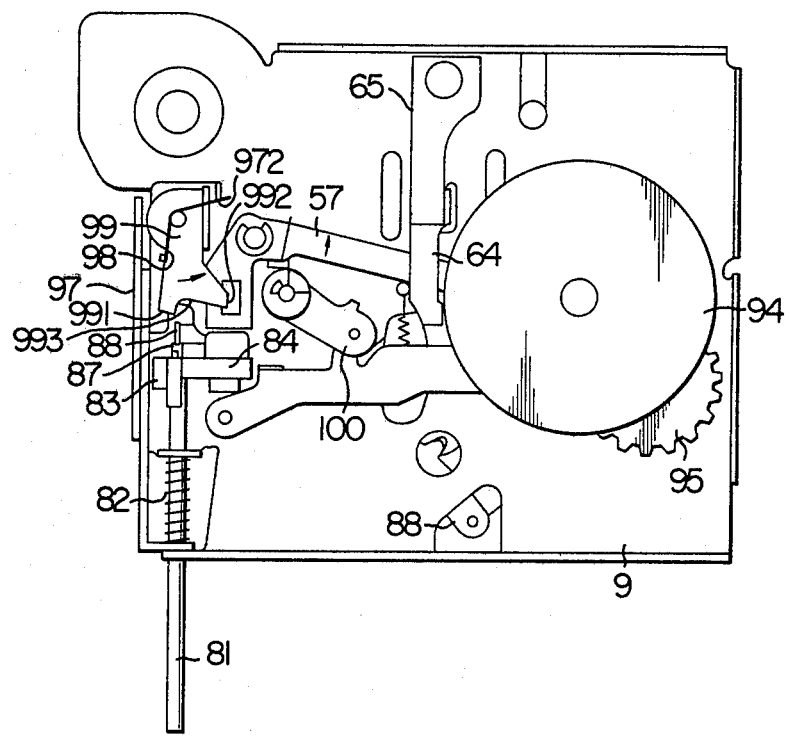

Hereinafter, an explanation will be made as to how the forwarding and the rewinding of the tape are performed, with reference to FIGS. 13 to 21. FIG. 13 is a view similar to that of FIG. 2, but is devoid of the cassette holder 4 and the guide holder 1, while FIG. 14 is a view similar to that of FIG. 6 devoid of the forwarding and rewinding mechanisms. FIGS. 15 to 21 show the details of essential parts. In FIGS. 13 to 21, the same parts or members to those of FIGS. 1 to 12 are designated at the same reference numerals. The reference numerals which for the first time appear in FIGS. 13 to 21 are not attached to FIGS. 1 to 12.

Figure 17:
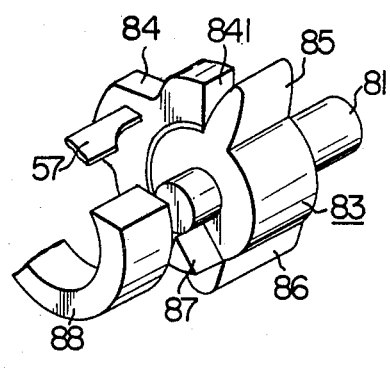
Figure 18:
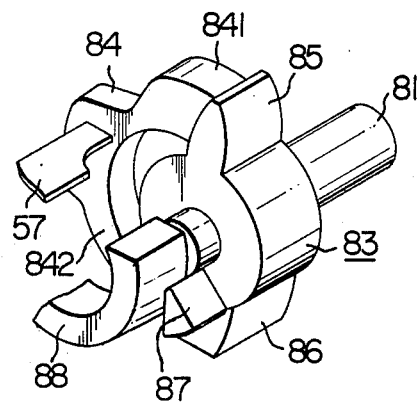
Figure 21:
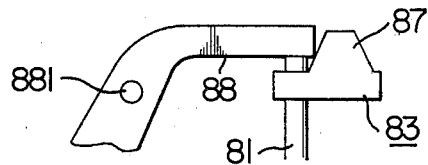

An eject shaft 81 is normally biased by a spring 82 in the direction of arrow, and is movable in the reverse direction. The eject shaft 81 is allowed also to rotate. A forwarding/rewinding change-over lever 83 is disposed at the end of the eject shaft 81, and is adapted to be actuated only by the rotation of the eject shaft 81. The lever 83 is provided with protrusions 85, 86 adapted to cooperate with end surfaces 841, 842 of a forwarding/rewinding cam 84, and an axially extending stopper piece 87. A transmission lever 88 is swingable on the main chassis 9, and has one end projected to a position in front of the eject shaft 81, as shown in FIGS. 17, 18 and 21. A spring 89 is adapted to pull the cassette detecting piece 51. A control lever 90 is pivoted at its base portion to the other end of the transmission lever 88, and is provided at its free end with a projection 911 for driving the stopper 30 and an opening 92 constituting a cam. The lever 90 is biased toward the reel drive shaft 91 by a spring 93 acting between both levers 88, 90. Reference numerals 94 and 95 denote, respectively, a fly-wheel and an idler. An idler switching plate 961 is suspended from the lower surface of the main chassis 9 by means of an elongated bore 971, and is adapted to be always subjected to the rotation of the fly-wheel 94. A cam 96 is formed on the idler 95, unitarily with the latter. A releasing plate 97 is adapted to be driven in the axial direction by the eject shaft 81, when the latter is depressed, and has a portion 972 for abutting a spring 98, as will be seen from FIG. 14. A forwarding/rewinding release plate 99 is swingable on the chassis 9, and is biased by the spring 98 in the direction opposite to the arrow, and is provided with an engaging piece 992 for engagement with the lever 57. The plate 99 further has a portion 993 to be abutted by the transmission lever 88, and a projection 991. A reference numeral 100 denotes an idler arm.

Figure 15:
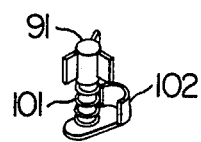
Figure 16:
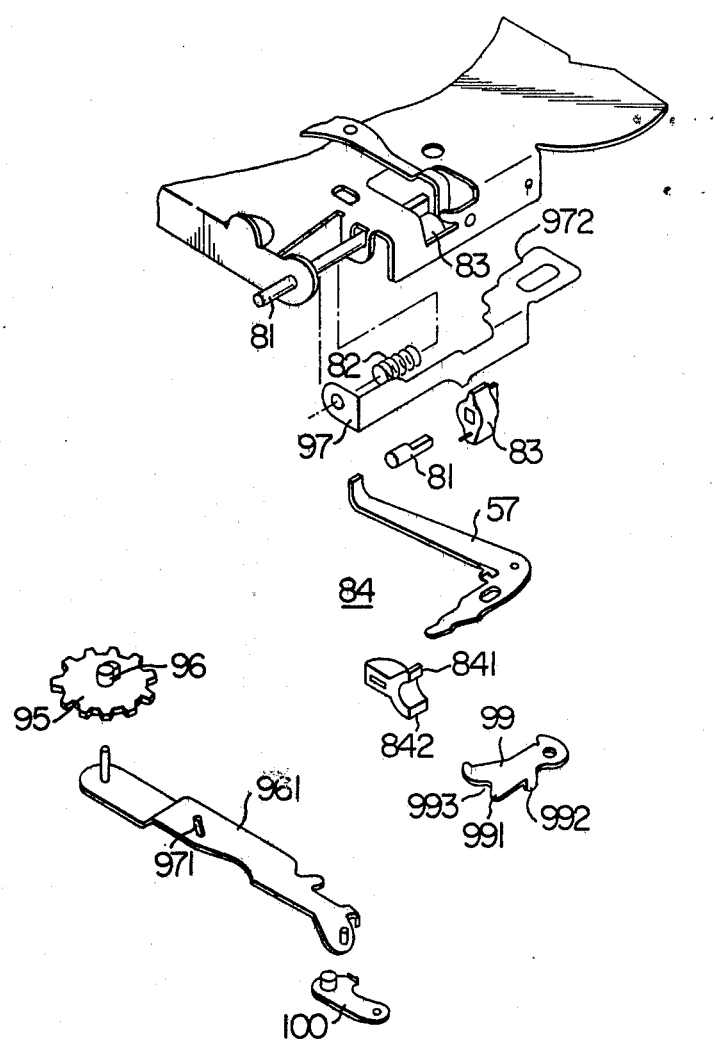

The reel drive shaft 91 has, as shown in FIG. 15, a shaft rotation detecting piece 102 which is adapted to be applied with a torque by a spring 101 when the shaft is rotated. The arrangment is such that the control lever 90 is pressed by the shaft rotation detecting piece 102, in the direction to overcome the force of the spring 93, when the reel drive shaft 91 is rotated. Namely, when the reel drive shaft 91 is rotated, the detecting piece 102 pressurizes the control lever 90 toward the spring 93, while, as the reel drive shaft 91 is stopped, the force exerted by the shaft rotation detecting piece 102 is extinguished so as to allow the lever 90 to be moved toward the drive shaft 91 by the force of the spring 93.

When the cassette is in the state as shown in FIG. 4 or 10, one end of the transmission lever 88 is positioned as shown in FIG. 17. As the eject shaft 81 is depressed in this state, the lever 88 is rotated around a pivot constituted by the shaft 881. Simultaneously, the lever 90 connected to the lever 88 acts on the stopper 30 so as to rotate the latter, thereby to effect the ejecting operation of the cassette.

On the other hand, if the eject shaft 81 is rotated during playing, one surface of the stopper piece 87 comes into contact with the transmission lever 88, as shown in FIG. 18, so that the eject shaft 81 is locked in the rotated state. At the same time, the lever 57 is actuated by the cam 84 so that the head mounting plate 54 is retracted rearwardly, and the condition of the player is switched to the fowarding or rewinding condition.

The forwarding or rewinding condition is dismissed by a depression of the eject shaft 81. However, an excessively large stroke of the depression of the eject shaft 81 may trigger the ejecting operation. To avoid this, the forwarding/rewinding release plate 99 is adapted to be rotated in the direction of the arrow in FIG. 14, following the rotation of the lever 57 in the same direction caused by the rotation of the eject shaft 81. As a result of this rotation of the release plate 99, the projection 991 of the release plate 99 comes to assume, in place of the abutting portion 993, a position on the same line as the eject shaft 81 and the lever 88, so as to limit the depression stroke of the eject shaft 81. It will be seen that, due to the provision of the release plate 99, the depression stroke of the eject shaft 81 during forwarding or rewinding operation is limited so that the depression may cause only the release of the player from the forwarding or rewinding condition. In other words, the accidental ejection of the cassette, which may be otherwise caused by an excessive depression of the eject shaft, is fairly avoided.

To explain in more detail, the locking of the transmission lever 88 by the stopper piece 87 as shown in FIG. 18 is dismissed. Then, as the eject shaft 81 is released from the depression force, the eject shaft 81 is rotated in the reverse direction so as to be reset to the starting position as shown in FIG. 17. In the course of resetting of the eject shaft 81, the releasing plate 97 is also reset to its starting position so that its abutting portion 972 drives the forwarding/rewinding release plate 99, through the spring 98, in the direction opposite to the direction of arrow. As a result, the portion 993 of the forwarding/rewinding release plate 99 comes to oppose to the end of the transmission lever 88, in place of the projection 991.

Figure 19A:
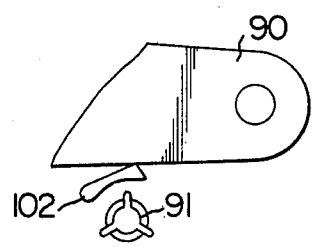
Figure 19B:
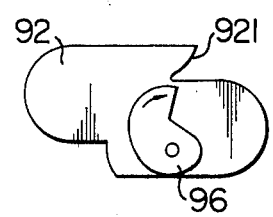
Figure 19C:
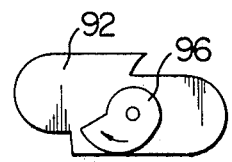

Hereinafter, a description will be made as to how the transmission lever 88 and the cam 96 are related to each other. During the playing, when the reel drive shaft 91 is rotated, the shaft rotation detecting piece 102 biases, as stated before, the lever 88 in the clockwise direction, i.e. toward the head 55, overcoming the biasing force of the spring 93. In this state, the cam 96 is rotated within the opening 92, following the rotation of the idler 95. In this case, the lever 88 is moved alternately clockwise and counter-clockwise, due to the interaction of the cam 96 and the opening 92, but the cam 96 does never engage the cam portion 921 of the opening 92 (FIG. 19B). FIG. 19A shows the lever 90 in the state in which it is biased in one direction by the shaft rotation detecting piece 102, while FIGS. 19A and 19B show how the cam 96 rotates within the opening 92.

Figure 20A:
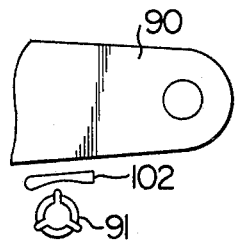
Figure 20B:
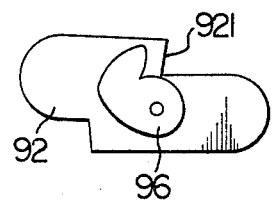

As the reel drive shaft 91 is stopped, the biasing force, which has been exerted on the lever 90 by the shaft rotation detecting piece 102 is extinguished so that the lever 90 is biased in the reverse direction, i.e. toward the reel drive shaft 91, by the force of the spring 93. Consequently, the cam 96 rotating in the opening 92 engages the cam portion 921 of the latter so that the lever 90 is moved toward the eject shaft 81 by the torque of the cam 96. Thus, the lever 90 in this state functions in the same manner as that caused by the depression of the eject shaft 81 so as to give a rotation instruction to the stopper 30, thereby to trigger an automatic ejection of the cassette. FIG. 20A shows how the shaft rotation detector 102 is related to the lever 90 when the reel drive shaft 91 is not rotated, while FIG. 20B shows the cam 96 just going to engage the cam portion 921.

As the eject shaft 81 is rotated clockwise or counter-clockwise during the playing, the lever 88 is locked as shown in FIG. 18 and, accordingly, the lever 90 is pressed by the lever 88 toward the stopper 30.

Meanwhile, the rotation of the stopper shaft 81 causes a movement of the idler 95 away from the reel drive shaft 91. As stated before, the idler 95 continues to rotate, even after it has been moved. Therefore, the cam 96 is allowed to rotate in the manner as shown in FIGS. 19A, 19B, also when the reel drive shaft 91 is being rotated by a power derived from another driving system.

If the rotation of the reel drive shaft 91 is stopped in this state, the cam 96 engages the cam portion 921 so that the lever 90 is moved toward the stopper shaft 81. As the result, the lever 88 is rotated around the axis of the shaft 881, and is unlocked from the stopper piece 87 so as to assume a position as shown in FIG. 17. Thus, the same operation as that caused by the depression of the stopper shaft 81 is performed.

Supposing that the state as shown in FIG. 18 is the state of forwarding, the cam 96 again engages the cam portion 921 so as to trigger the ejecting operation, if the reel drive shaft 91 is not rotated, even after the lever 88 has been reset to the position of FIG. 17.

In contrast to the above, provided that the state as shown in FIG. 18 is the rewinding state, the player is switched to the playing condition when the lever 88 has been rotated to the position of FIG. 17 so that the playing operation is commenced from the beginning of the tape.

In the described embodiment, the ejecting operation, and the forwarding and rewinding operations can be triggered by depressing the eject shaft 81 and rotating the same right and left. At the same time, the forwarding and the rewinding condition can be dismissed by a depression of the eject shaft 81. In this regard, regarding the supporting portion of the lever 88 and the tapered portion of the stopper 87, it is preferred to provide a certain degree of freedom such that the release from the locking is made through a sliding movement of the end of the lever 88 along the tapered surface of the stopper 87 when the eject shaft 81 is rotated in the reverse direction to the direction for forwarding or rewinding, because, by doing so, the eject shaft 81 and the associated parts are conveniently protected.

As will be seen from the foregoing description of the embodiment, it will be seen that, according to the invention, ejecting, forwarding and rewinding operations of the cassette tape player are managed simply by means of a single shaft. At the same time, the area on the front panel required for these operations can be reduced as compared with conventional player in which a considerably large area is required for accomodating the swinging movement of a lever for triggering, forwarding and rewinding.

In addition, according to the invention, automatic release from the forwarding and rewinding conditions, as well as an automatic ejecting operation, can be performed, so as to improve the practical utility of the cassette tape player.

Figure 22:
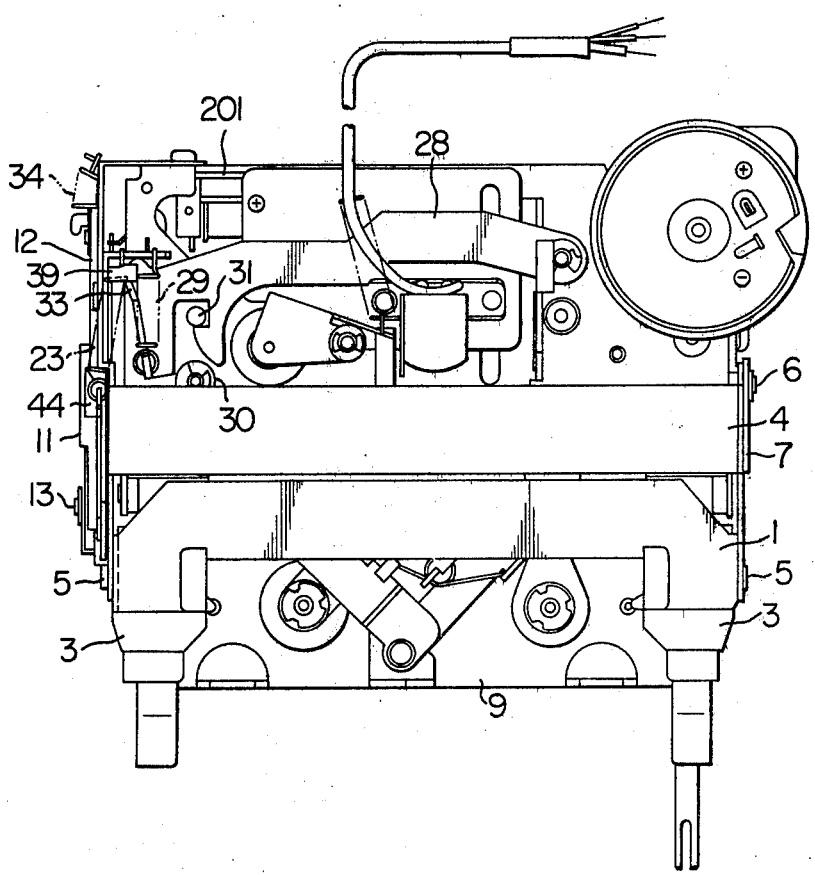
Figure 23:
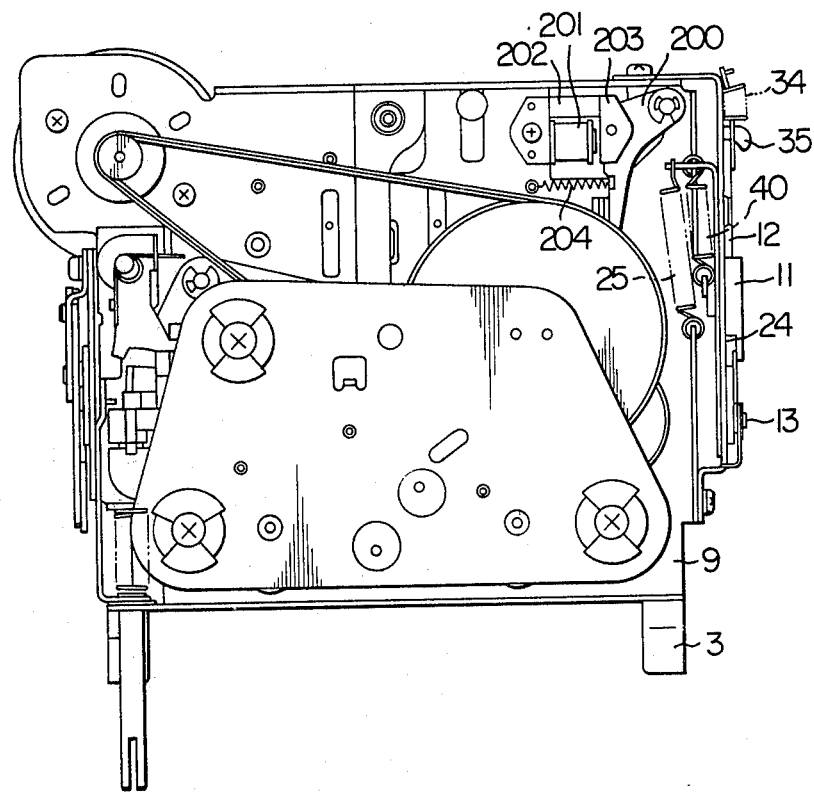
Figure 24:
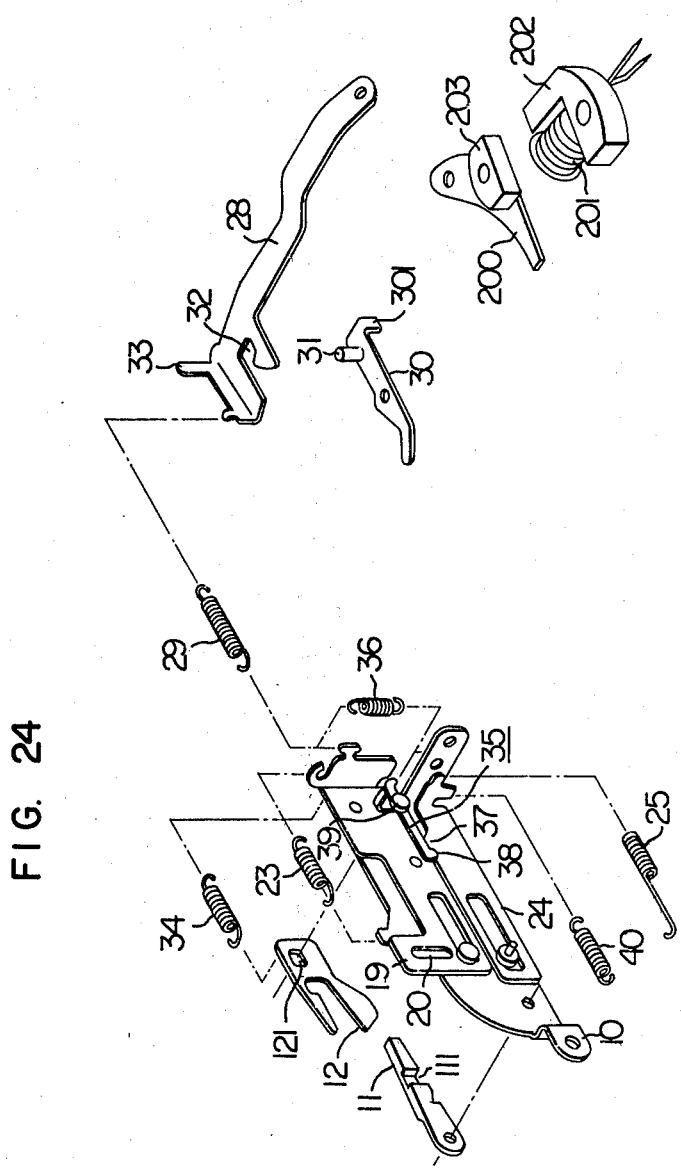
Figure 25:
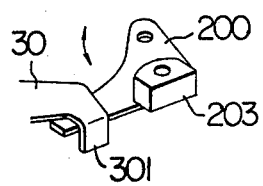

FIGS. 22 to 28 in combination show another embodiment of the invention in which the ejecting operation is automatically triggered when the power supply is cut off. FIGS. 22 to 24 materially correspond to FIGS. 2, 6 and 7. This embodiment differs from the first embodiment only in the following points.

The stopper 30 is provided with a portion 301 adapted for engagement with a control plate 200 which is rotatably held by the back surface of the main chassis 9. Reference numerals 204, 203 and 202 denote, respectively, an auxiliary spring, an attractable plate fixed to the control plate 200, and a fixture for fixing a solenoid 201 to the main chassis 9. The solenoid 201 functions, when energized, to hold the locking of the engaging portion 32 by the stopper piece 31.

Figure 26:
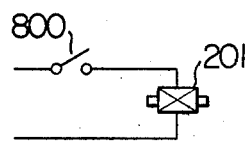
Figure 27:
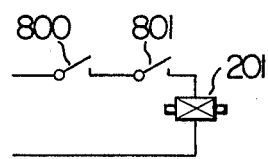
Figure 28:
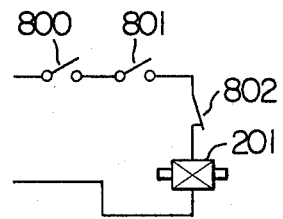

In operation, as the solenoid 201 is energized the attractable plate 203 is attracted by the solenoid 201, so that the control plate 200 is rotated, thereby to lock the stopper 30. Consequently, the eject plate 28 is kept in the locked condition, due to the engagement of the stopper piece 31 with the engaging portion 32. In this state, as the cassette 2 is inserted deeper into the player along the tape guides 3, the slide plate 19 is moved as shown in FIGS. 8 and 9, through the action of the charge plate 27. The solenoid 201 is connected in series to the power source switch 800, as shown in FIG. 26, so that it may be de-energized as the power source switch is turned off. At the same time, the force of the spring 29 is selected larger than that of the auxiliary spring 204. Consequently, as the power source switch 800 is turned off, the eject plate 28 is returned by the force of the spring 29, so that the engaging portion 32 is freed from the stopper 31 so as to trigger the ejecting operation. The power source switch 800 may be a switch peculiar to the cassette tape player or, alternatively, constituted by the ignition key of the engine when the player is installed in a motorcar. It is possible to provide a switch 801, which is adapted to be turned on in the course of insertion of the cassette, in the circuit for the solenoid 201, as shown in FIG. 27. Further, a switch 802, which is adapted to be opened upon detect of the movement of the stopper 30 caused by the lever 90, may be inserted in the circuit for energizing the solenoid 201, as shown in FIG. 28.

This embodiment offers an advantage that the cassette is automatically ejected when the power supply is cut off, in addition to the advantages brought about by the first embodiment, i.e. a simple management of forwarding, rewinding and eject operation by a single shaft, as well as the release from the forwarding and rewinding conditions by the same shaft. Further, this arrangement is superior in that the pinch roller is conveniently protected, because the player is in the ejecting state when the power is not supplied.

What is claimed is:

1. In a cassette tape player wherein a cassette tape is horizontally inserted and then vertically moved into a playing position and is ejected by a reverse vertical and then horizontal movement of the cassette tape, and which provides a fast forwarding operation and a rewinding operation, said cassette tape player includes a stopper means which swings through a predetermined angle when the cassette is horizontally inserted a predetermined distance and moves slightly backwards in the horizontal direction opposite to the cassette inserting direction together with the cassette when the cassette inserting force is relieved, thereby allowing the cassette to vertically move into the playing position;

a first means, including a member movable in one direction and rotatable, to set the fast forwarding operation or the rewinding operation through the rotation of said member, and to eject the cassette from the playing position or to reset to the playing mode from the fast forwarding operation or the rewinding operation through the movement of said member in said one direction;

a second means, operable independent of said first means, for detecting stopping of movements of the tape and to eject the cassette from the playing position when said member is displaced in said one direction or to reset to the playing mode from the fast forwarding operation or the rewinding operation, when said member is not displaced.

2. A cassette tape player as set forth in claim 1, wherein said cassette tape player comprises a chassis, a lateral plate fixed to said chassis and means for providing a cassette ejecting force comprising, a slide plate and said stopper means, and further comprising a stopper rotatably and linearably movable in one direction mounted to said lateral plate, said stopper having a locking portion which is swingable through the predetermined angle when the cassette is horizontally inserted to the predetermined distance so as to engage with said slide plate, and a timing stopper which is actuated through the slight movement of said stopper in said backwards direction so as to allow the cassette horizontally inserted to be vertically moved to set the cassette in the playing position.

3. A cassette tape player as set forth in claim 1, wherein said first means further includes a transmission lever operated by movement of said member in said one direction, and said second means includes a control lever mechanically coupled to said transmission lever whereby movement of said member actuates on ejecting operation through said transmission lever and said control lever when said cassette tape player is in the playing position, said second means actuates said transmission lever through said control lever when said second means detects the end of the tape running.

4. A cassette tape player as set forth in claim 3, wherein said cassette tape player further comprises means for automatically ejecting said cassette through said control lever when said cassette tape player is deenergized.

5. A cassette tape player having a play head comprising:

means positioning a cassette tape with respect to said playing head from a non-play position in a first horizontal plane to playing position in a second horizontal plane comprising means receiving and supporting said cassette tape in said first horizontal plane when a horizontal inserting force is applied to said cassette tape and means vertically moving said supported cassette tape into said playing position when said inserting force is removed;

a rotatable and axially movable shaft mounted in said cassette tape player;

means for winding said cassette tape in a forward direction in response to the rotation of said shaft in a first direction, and in the reverse direction in response to rotation of said shaft in a second direction; and means for ejecting said cassette tape from the playing position in response to the axial movement of said shaft.

6. The cassette tape player of claim 5, further comprising means for detecting the conclusion of a winding sequence; and means coupled to said means for ejecting responsive to said means for detecting for ejecting said cassette tape at the conclusion of a winding sequence.

7. A cassette tape player comprising:
a main chassis;
a playback head mounted to said chassis for providing a signal from a cassette tape;

a cassette holder pivoted to said chassis, said holder having a guide pivoted thereto for supporting a cassette tape in a horizontal plane whereby said cassette tape may be moved from a first horizontal plane to a second horizontal plane for engagement with said playback head;

slide means in engagement with said cassette tape, said slide means being movable in said first horizontal plane from a first position to a second position in response to an actuating force applied to said cassette tape for initiating a playing sequence;

biasing means acting in opposition to said force for urging said slide means away from said second position toward said first position;

stopper means for holding said slide means at a third position between said first and second positions;

means coupled to said slide means for pivoting said cassette holder in response to the engagement of said slide means with said stopper whereby said cassette tape is vertically moved to said second horizontal plane when said actuating force is released;

ejectment means coupled to said cassette holder for returning said cassette tape to said first horizontal plane;

a rotatable shaft supported to said chassis, said shaft being axially movable, one end of said shaft being engaged with said ejectment means whereby said cassette tape is returned to said first horizontal plane upon the axial movement of said shaft; and winding means coupled to said rotatable shaft, said winding means providing the winding of said cassette tape in a first direction in response to the clockwise rotation of said shaft, and in an opposite direction in response to the counterclockwise rotation of said shaft.

* * * * *